United States Patent
Mahrt et al.

(10) Patent No.: US 9,916,867 B2
(45) Date of Patent: Mar. 13, 2018

(54) VIDEO CAPTURE AND TESTING OF MEDIA PLAYER PLAYBACK OF A VIDEO

(71) Applicant: HULU, LLC, Santa Monica, CA (US)

(72) Inventors: Dallas S. Mahrt, Seattle, WA (US); Kirill Timofeev, Issaquah, WA (US)

(73) Assignee: HULU, LLC, Santa Monica, CA (US)

( * ) Notice: Subject to any disclaimer, the term of this patent is extended or adjusted under 35 U.S.C. 154(b) by 61 days.

(21) Appl. No.: 14/989,004

(22) Filed: Jan. 6, 2016

(65) Prior Publication Data

US 2017/0194035 A1  Jul. 6, 2017

(51) Int. Cl.
| | |
|---|---|
| *H04N 5/94* | (2006.01) |
| *G11B 27/36* | (2006.01) |
| *G06K 9/00* | (2006.01) |
| *G06K 9/52* | (2006.01) |
| *G06K 19/06* | (2006.01) |

(52) U.S. Cl.
CPC .......... *G11B 27/36* (2013.01); *G06K 9/00718* (2013.01); *G06K 9/00744* (2013.01); *G06K 9/00758* (2013.01); *G06K 9/52* (2013.01); *G06K 19/06037* (2013.01); *G06K 2009/00738* (2013.01)

(58) Field of Classification Search
CPC ...... H04N 9/8042; H04N 5/85; G11B 27/105; G11B 27/3027; G11B 2220/20
USPC .......................................................... 386/263
See application file for complete search history.

(56) References Cited

U.S. PATENT DOCUMENTS

2008/0256394 A1* 10/2008 Rashevsky .......... G06F 11/3616
  714/38.1
2013/0209070 A1*  8/2013 Rivas-Micoud ... H04N 5/44591
  386/285

* cited by examiner

*Primary Examiner* — William C Vaughn, Jr.
*Assistant Examiner* — Daniel Tekle
(74) *Attorney, Agent, or Firm* — Fountainhead Law Group P.C.

(57) ABSTRACT

In one embodiment, a capture video is received that is captured during the playback of a trace video on a media player on a hardware platform. The capture video may be an external capture of a display of the trace video on the media player. To allow the external capture to be analyzed, the trace video may include visible codes on frames of the trace video that can be captured by a capture device. Particular embodiments analyze the frames of the capture video to extract identifiers associated with the visual codes on the frames. Events that occurred during playback are determined by analyzing a sequence of identifiers from the capture video to an expected sequence of identifiers from the trace video. Then, particular embodiments determine whether an API call from the media player was received that corresponds to the event while the media player was playing the trace video.

20 Claims, 8 Drawing Sheets

VIDEO CAPTURE AND TESTING OF MEDIA PLAYER PLAYBACK OF A VIDEO

BACKGROUND

Delivery of video content is available through a variety of hardware platforms, such as mobile devices or living room-connected devices (e.g., gaming consoles, streaming devices, and smart televisions), laptop computers, etc. Different hardware platforms may have different media players, which may each be implemented differently. For example, the media players may have been developed internally by a media streaming service or may be pre-installed as part of the hardware platform. The different implementations may react to different streaming conditions differently. The media streaming service thus needs to test these different media player implementations to determine whether playback problems may occur.

The testing of the different media player implementations may be performed manually. For example, a tester may physically watch a video being played by the different platforms. However, testing the platforms in this way is very labor intensive.

SUMMARY

In one embodiment, a method receives a capture video of an external capture of a trace video being played on a media player of a hardware platform. The trace video displays visual codes on the media player. Then, the method analyzes frames of the capture video to extract visible codes on each of the frames, each visible code associated with an identifier identifying a respective frame of the capture video. It is determined when an event occurred during playback of the capture video on the media player by comparing a sequence of the identifiers to an expected sequence of frames of the trace video. The event is correlated to a set of calls received from the media player to determine whether a call was received that corresponds to the event while the media player was playing the capture video.

In one embodiment, a non-transitory computer-readable storage medium contains instructions, that when executed, control a computer system to be configured for: receiving a capture video of an external capture of a trace video being played on a media player of a hardware platform, wherein the trace video displays visual codes on the media player; analyzing frames of the capture video to extract visible codes on each of the frames, each visible code associated with an identifier identifying a respective frame of the capture video; determining that an event occurred during playback of the capture video on the media player by comparing a sequence of the identifiers to an expected sequence of frames of the trace video; and correlating the event to a set of calls received from the media player to determine whether a call was received that corresponds to the event while the media player was playing the capture video.

In one embodiment, an apparatus includes: one or more computer processors; and a non-transitory computer-readable storage medium comprising instructions, that when executed, control the one or more computer processors to be configured for: receiving a capture video of an external capture of a trace video being played on a media player of a hardware platform, wherein the trace video displays visual codes on the media player; analyzing frames of the capture video to extract visible codes on each of the frames, each visible code associated with an identifier identifying a respective frame of the capture video; determining that an event occurred during playback of the capture video on the media player by comparing a sequence of the identifiers to an expected sequence of frames of the trace video; and correlating the event to a set of calls received from the media player to determine whether a call was received that corresponds to the event while the media player was playing the capture video.

The following detailed description and accompanying drawings provide a better understanding of the nature and advantages of particular embodiments.

DETAILED DESCRIPTION

Described herein are techniques for a video delivery testing system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

A media program streaming service streams media programs, such as video content, on a large number of different hardware platforms using a variety of media player technologies. The media players may have been developed internally by the media program streaming service or may have been developed by other companies, such as the media players are part of the hardware platform. Particular embodiments test the media players as they operate on the different hardware platforms for playback accuracy in an automated procedure. The testing can automatically detect media playback issues on different hardware platforms and also the verify that the media player playback events are correctly reported through application programming interfaces (APIs) by correlating media player-generated events with observed behavior captured via external methods.

In one embodiment, a capture video is received that is captured during the playback of a trace video on a media player on a hardware platform. The capture video may be an external capture of a display of the trace video on the media player. To allow the external capture to be analyzed, the trace video may include visible codes on frames of the trace video that can be captured by a capture device. Particular embodiments analyze the frames of the capture video to extract identifiers associated with the visual codes on the frames. Events that occurred during playback are determined by analyzing a sequence of identifiers from the capture video to an expected sequence of identifiers from the trace video. Then, particular embodiments determine whether an API call from the media player was received that corresponds to the event while the media player was playing the trace video. The external capture verifies that the event was correctly reported via the API call.

Figure 1:
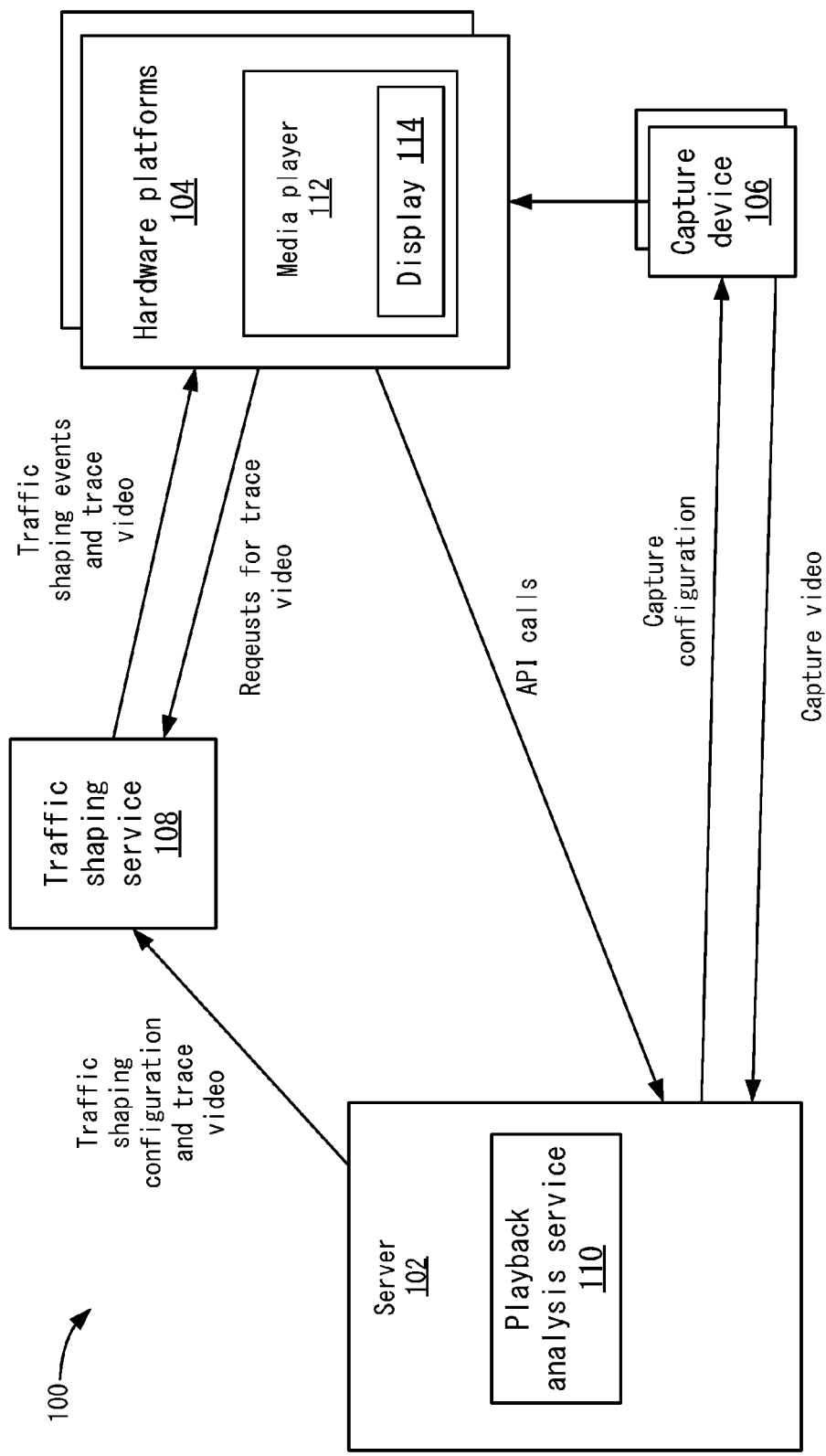
FIG. 1 depicts a system for testing media players on different hardware platforms according to one embodiment.

FIG. 1 depicts a system 100 for testing media players on different hardware platforms according to one embodiment. System 100 includes a server 102, different hardware platforms 104, capture devices 106, and a traffic-shaping service 108. One instance of a hardware platform 104 and a capture device 106 will be described but it will be understood that multiple instances of any of the entities in system 100 may be appreciated. In one embodiment, each hardware platform 104 may be associated with a capture device 106. In other embodiments, a capture device 106 may be used for different hardware platforms 104.

Hardware platform 104 may be include computing devices that have a media player 112 installed on them. Hardware platforms may be classified by company and/or type. Types may include mobile, living room, website, etc. Different companies may include their own hardware platform in each type. Different hardware platforms 104 may have different media players 112. For example, media players 112 may use different technology or protocols to stream videos. It is important for a media program service to test the different media players 112 found on different hardware platforms 104 to ensure the media players are operating properly with the service.

Server 102 may send a video to media player 112 for display on a display 114. In one embodiment, a content delivery network (CDN) (not shown) may be used to send the video via a wide area network (WAN). In this case, server 102 or traffic-shaping service 108 may configure media player 112 to request the video from the CDN (e.g., request segments of the video). In other embodiments, server 102 or traffic-shaping service 108 may deliver the video itself (or certain segments of the video along with the CDN). In one embodiment, server 102 may be associated with the media program delivery service and CDNs may be separate entities.

Traffic-shaping service 108 may receive traffic-shaping commands from server 102 and provide traffic-shaping events to hardware platform 104. This may cause media player 112 to simulate events that may occur, such as re-buffering, switching to requesting different bitrates of a media program, pausing playback, skipping to different positions in the media program, stalling, etc. Also, hardware platform 104 may locally play video without receiving it via a wide area network, and traffic-shaping service 108 may be used to simulate the streaming of the video through the WAN. Although traffic-shaping service 108 is described, it will be understood that the traffic-shaping events may not need to be used and the testing of media player 112 may be performed by just streaming the video from server 102 to hardware platform 104.

During streaming of the trace video to hardware platform 104, media player 112 displays the trace video on display 114. This allows capture device 106 to capture the trace video being displayed on display 114. Capture device 106 may capture of the trace video in different ways. For example, capture device 106 may capture an image of frames displayed on display 114. In this embodiment, capture device 106 may be a video recorder that is pointed at display 114 and can capture the images via a lens. In other embodiments, capture device 106 may be coupled to an external output of media player 112 and/or hardware platform 104 via a connection (e.g., wired or wireless). The external output provides video to capture device 106, which can then capture images of the frames of the trace video. This embodiment does not need to capture the images being displayed on display 114.

In one embodiment, capture device 106 is capturing the images of the trace video at a consistent frame rate that is at least as fast as the frame rate of the trace video. This ensures that the images in the capture video can be accurately compared against the trace video. That is, the rate of change of images in both videos is similar. The frame rate may be set in both capture device 106 and media player 112 to be substantially similar, such as at the same value or within an error percentage. Also, in one embodiment, all the frames of capture video are captured. In other embodiments, a portion of the trace video frames that are displayed is captured in the capture video.

To perform the testing, server 102 needs to configure the entities of system 100. In one embodiment, the configuration is performed dynamically. Server 102 is configured to communicate with capture device 106, traffic-shaping service 108, and hardware platform 104 to perform the configuration.

In one embodiment, server 102 provides traffic-shaping commands to traffic-shaping service 108, which causes traffic-shaping events to occur at media player 112 at the configured times. Also, server 102 causes media player 112 to request the trace video for playing on media player 112. For example, server 102 may send a playlist to media player 112, which can use the playlist to request segments of the trace video from a specified CDN. Further, server 102 sends a capture configuration to capture device 106. The capture configuration may configure capture device 106 to capture the images of the trace video. For example, the capture configuration may start the capture of the trace video, configure the frame rate of the capture, and stop the capture of the trace video.

Once the capture video is captures, server 102 includes a playback analysis service 110 that can analyze a capture video received from capture device 106. As will be described in more detail below, playback analysis service 110 may analyze the capture video based on the trace video. Different events that occur during the playback can be determined by the analysis. Then, playback analysis service 110 can verify that API calls were received for the events from media player 112.

Particular embodiments use the external capture method to capture the actual events being experienced on media player 112. Instead of just verifying that the API calls were received for an event caused by traffic-shaping, playback analysis service 110 can also analyze the outputted images of the trace video to verify that media player 112 actually experienced the event. In this case, playback analysis service 110 can verify that media player 112 experienced the event and an API call was received indicating the event occurred. This also allows the verification that the event actually occurred at media player 112, but an API call was not received. If the external verification was not used, then system 100 would not have a way to actually know that the event did or did not occur. Playback analysis service 110 can only observe (programmatically) what the media player discloses through its APIs. If these APIs are incorrect, then playback analysis service 110 will not be able to discern the error unless it is observed on the output (e.g., display) of media player 112. Visual verification tells playback analysis service 110 what is actually happening during playback regardless what API calls are received. This allows playback analysis service 110 to verify the API calls of the media player 112 are accurate.

To allow playback analysis service 110 to perform the analysis, the media program delivery service adds identifiers to frames of the trace video. In one embodiment, the frames of the trace video may include visual codes, such as quick response (QR) codes, that are placed in the trace video. Each code may identify the corresponding frame, such as the QR code may encode the frame identifier. A visual code may be information that can be captured by capture device 106 where the identifier for the frame can be determined from the information. QR codes will be discussed, but other visual codes may be used, and in one embodiment, the visual code may just be the identifier (e.g., the numbers 1, 2, 3, etc.).

In one embodiment, each QR code is placed in a different position, such as a different corner of the frame, from the previous frame (or frames) and the next frame (or frames). In one embodiment, the four corners are used and each QR code is placed in a different corner of the frame than the previous three. However, positions other than the corners may be used as long as no overlapping of the codes occurs. The changing of positions is used to prevent blurring between frames where a previous frame's QR code shows up on a current frame. The previous frame's QR code may show up on the current frame when the capture rate is slightly off. That is, the image captured is not exactly the point in time where only the current frame's QR code is shown. If the two QR codes were displayed in the same position, then the codes would be corrupted due to overlapping content.

Figure 2:
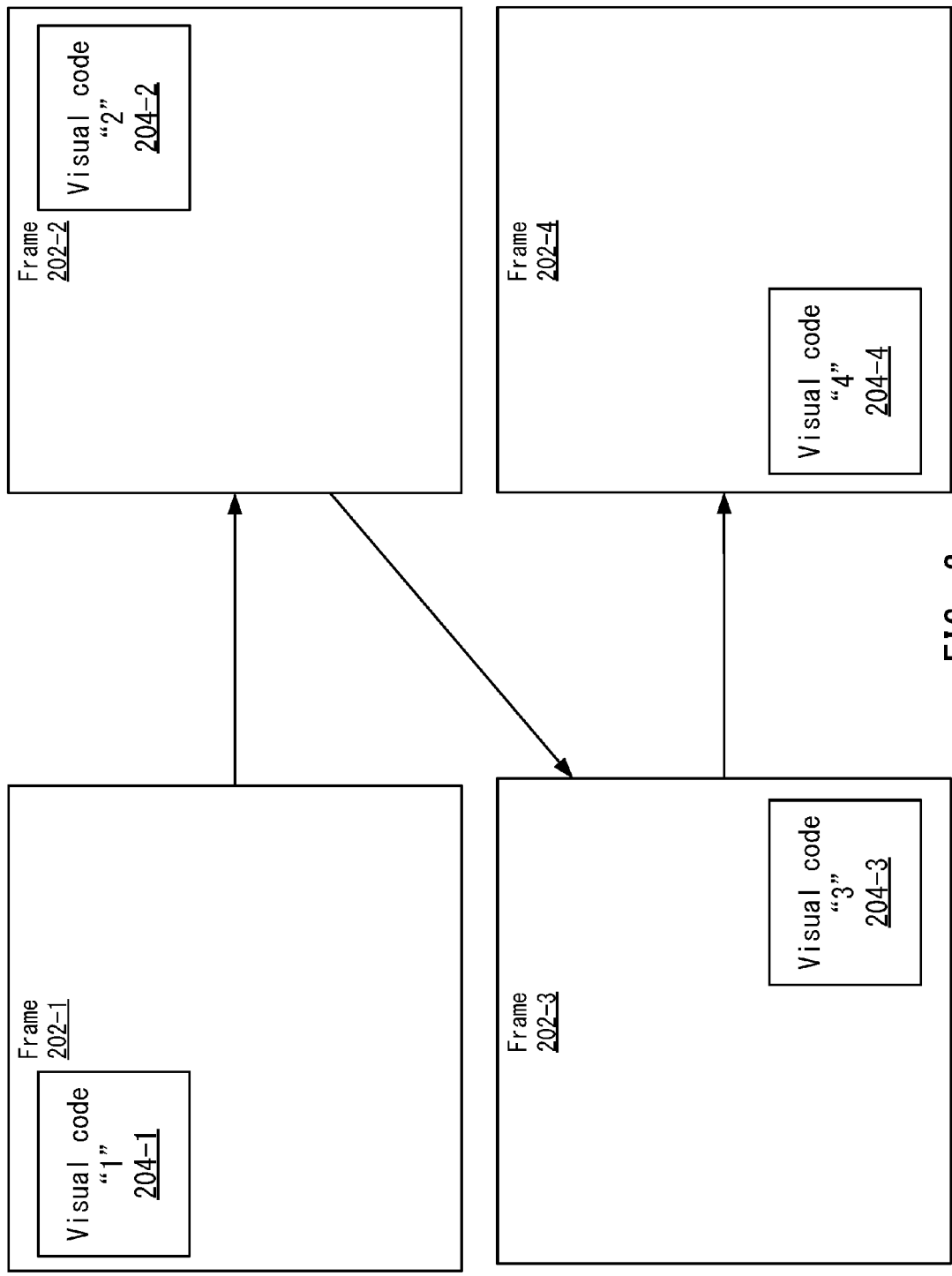
FIG. 2 depicts an example of a sequence of frames of the trace video according to one embodiment.

FIG. 2 depicts an example of a sequence of frames 202-1-202-4 of the trace video according to one embodiment. It will be understood that more frames of the trace video will be appreciated. The sequence goes from frame 202-1 to frame 202-2 and frame 202-3, and finally to frame 202-4. In frame 202-1, a first QR code 204-1 is shown in the upper left corner. QR code 204-1 may encode an identifier for the frame, such as the number "1". Other information may also be encoded, such as a frame rate, media program bitrate, identifying information for the trace video, a CDN identifier, etc. Further, the video may also include some type of information, such as other video content, or text identifying the trace video. The QR code may be used because the code can be scanned and the identifier extracted easily, but other codes may also be used.

In a next frame 202-2, a second QR code 204-2 is shown in the upper right corner of the frame. This is a different position compared to first QR code 204-1 in frame 202-1. The different position is used so the QR codes do not overlap when both QR codes appear on an image captured by capture device 106. By changing the position such that they are not overlapping, blurring does not result.

The changing of the QR codes continues as QR code 204-3 in frame 202-3 is in the lower right corner and includes the identifier "3". QR code 202-4 is in the lower left corner of frames 202-4 and includes the identifier "4". The next frame after frame 202-4 may include a QR code at the same position as QR code 204-1. Also, instead of four positions, different numbers of positions may also be used. The capture video includes frames that captured a series of images with QR codes. These frames need to be analyzed to verify events occurred at media player 112.

Figure 3:
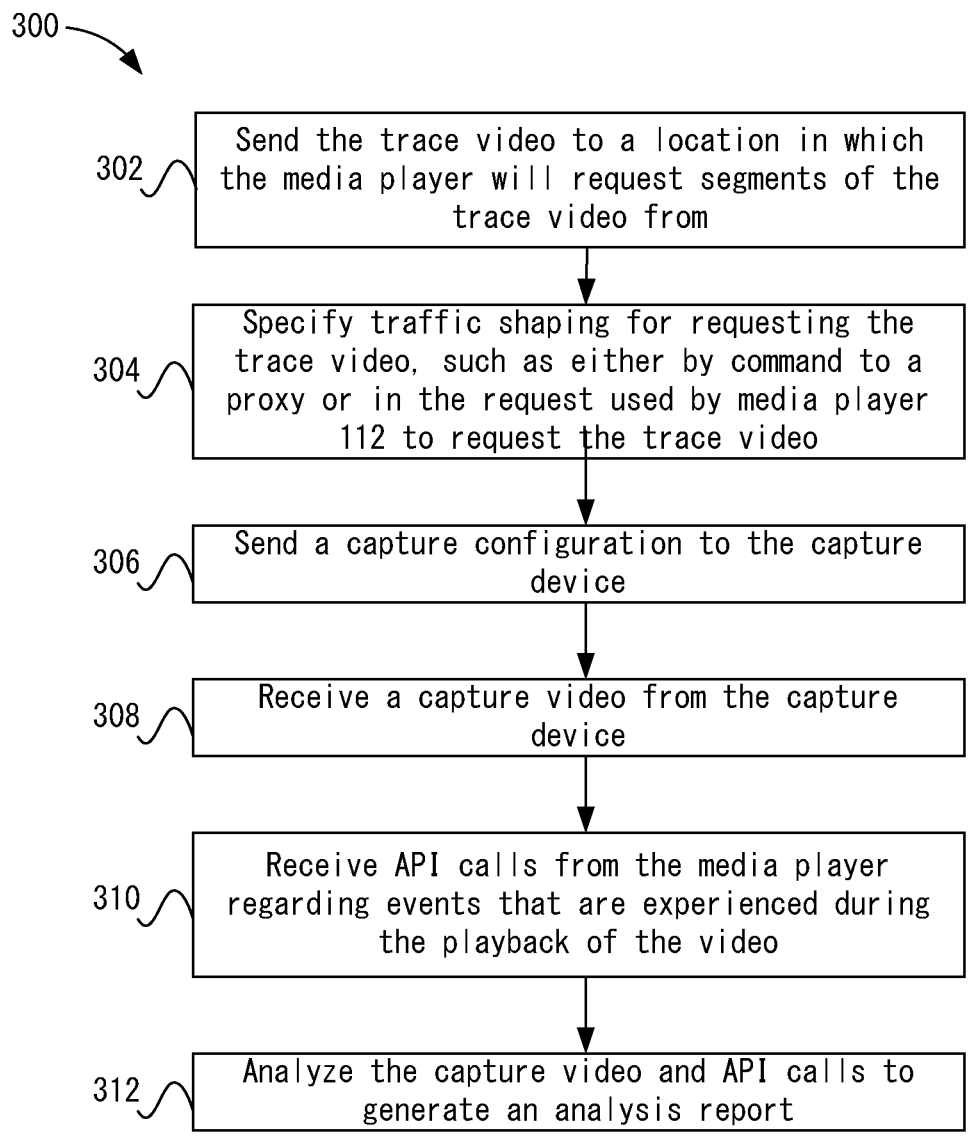
FIG. 3 depicts a simplified flowchart of an overall process for testing hardware platform 104 according to one embodiment.

Before discussing the analysis part, the overall process of generating a capture video will be discussed. FIG. 3 depicts a simplified flowchart 300 of an overall process for testing hardware platform 104 according to one embodiment. At 302, server 102 sends the trace video to a location in which media player 112 will request segments of the trace video from. For example, the trace video may be sent to traffic-shaping service 108 and/or a CDN.

At 304, server 102 specifies traffic shaping for requesting the trace video, such as either by command to a proxy or in the request used by media player 112 to request the trace video. These commands configure traffic-shaping service 108 to cause events to occur at media player 112. In one embodiment, the commands may indicate video segments of the video in which to cause a certain event to occur. In some embodiments, this step may be optional.

At 306, server 102 sends a capture configuration to capture device 106. The capture configuration configures capture device 106 with capture parameters and also start and stops the recording of images of the trace video. This automatically configures the settings of capture device 106. This is needed because capture device 106 may be capturing different trace videos that are played at different frame rates and the frame capture rate needs to be configured on capture device 106. Further, coordination with the sending of the trace video to hardware platform 104 with the capture is also needed for an accurate capture of the trace video. The configuring of the frame rate may be performed by specifying which rate to select to media player 112.

The trace video is then played back at media player 112 and capture device captures the capture video during the playback of the trace video. At 308, server 102 receives a capture video from capture device 106. The capture video includes frames that captured images displayed on display 114. As mentioned above, the capture is external and could be performed in different ways. Further, at 310, server 102 receives API calls from media player 112 regarding events that are experienced during the playback of the video.

At 312, playback analysis service 110 analyzes the capture video and API calls to generate an analysis report. The report that is generated will be described in more detail below.

Figure 4:
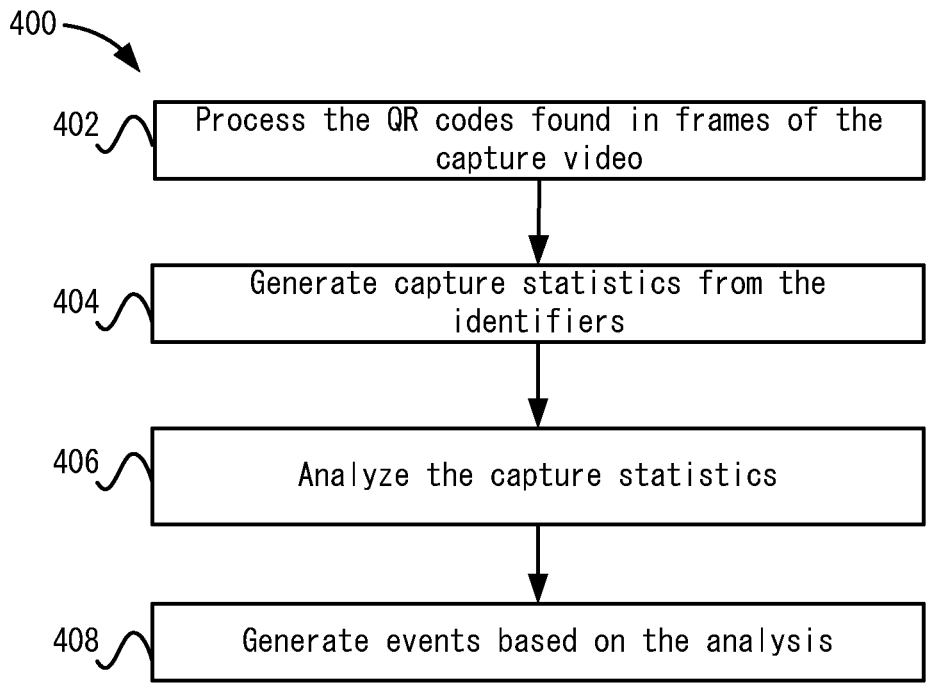
FIG. 4 depicts a simplified flowchart of a method for analyzing the playback according to one embodiment.

In the analysis phase, playback analysis service 110 may first parse the capture video to generate capture video statistics and then analyze the capture video statistics to assess the performance of media player 112. FIG. 4 depicts a simplified flowchart 400 of a method for analyzing the playback according to one embodiment. At 402, playback analysis service 110 processes the QR codes found in frames of the capture video. In processing the QR codes, playback analysis service 110 may extract the identifiers from the QR codes found on the frame using a scanner. A highest identifier that is extracted is assigned as the identifier for the captured frame. The highest identifier is extracted from the QR codes found on the frame because of the possibility that QR codes from prior frames may still be displayed on the current frame. However, playback analysis service 110 knows that the highest identifier from a QR code on the frame is the correct one and that lower identifiers are from previous frames. Because the QR codes were displayed in different positions, blurring of the QR codes does not result and the identifiers can be identified correctly.

At 404, playback analysis service 110 generates capture statistics from the identifiers. The capture statistics may be frame-by-frame statistics that are extracted based on the identifiers from the QR codes. For example, the identifiers may be arranged in a sequence to determine an order of capture of frames from the trace video. At 406, playback analysis service 110 then analyzes the capture statistics. The analysis may be based on any of the configurations that server 102 sent to either traffic shaping service 108 or capture device 106, and/or the trace video itself. For example, a comparison may compare a rate of change of sequence of identifiers from the trace video to a rate of change of a sequence of identifiers found in the capture video. Differences in the rate of change may indicate various events may have occurred.

In one example of an analysis, for each video (trace video and capture video), the frame rate is constant. This means that a fixed amount of time occurs between the two frames. This amount of time is 1/frame rate seconds. So for a 30 fps (frames per second) video, the time between two frames is roughly 1/30 seconds. Playback analysis service 110 uses the ratio between the two frame rates of the trace video and the capture video in the analysis to determine events. In other embodiments, the analysis may be based on comparing the QR codes of the capture video to the expected sequence of identifiers in the capture video. This comparing of the QR codes may detect stalls and jumps. The use of the frame rates may detect drift, which may be where the capture video may slowly drift away from the trace video. Drift cannot be captured at a discrete point in time and needs to be analyzed over a longer stretch. Drift may be detected by looking at a comparison of the frame rates to see when the graph varies from a linear relationship.

The frame rate of the trace video will be referred to as FRt and the frame rate of the capture video will be referred to as FRc. Since both frame rates are constant, the ratio between the two frame rates should be constant. This is why normal playback is linear with a slope of FRt/FRc.

Playback analysis service 110 analyzes a capture file by first splitting the capture file into its individual frames for each frame. Then, playback analysis service 110 records the frame number of the captured frame (FNc) and detects the frame number of the trace video from the QR code (Fnt). If multiple QR codes are visible, playback analysis service 110 uses the highest frame. From this, playback analysis service 110 generates a list of pairs (FNc,FNt). Since the rate is constant, playback analysis service 110 looks for changes in that rate between the trace video and the capture video. These are inflection points where events may have occurred.

Playback analysis service 110 may analyze the changes to determine the type of event. For example, if a big jump in the frame rate of the trace video occurs, playback analysis service 110 determines a jump or skip of some sort: either forward or backward. If the frame rate of the trace video remains constant, playback analysis service 110 determines a pause or stall has occurred. Skips can be detected when a playback frame is not what is expected and not the same as the previous capture video frames. The position and duration of the skip can be determined by the difference between adjacent playback frames based on the capture video. For example, if the previous capture video identifier is frame #5 and the current identifier in the capture video is frame #10, then the playback skipped five frames. Playback analysis service 110 may determine the amount of the skip and compare the skip to a threshold to determine if this should be flagged as an event. For example, a skip of more than 3 frames is flagged.

Stalls in the playback may also be detected when the capture video frame identifier remains the same when compared to changing identifiers for the trace video frames. That is, the capture video frame identifier may stay at frame #5, while the trace video frame increases from frame #5 to frame #6. The duration of the stall is determined by the number of capture video frames with the same playback frame identifier divided by the capture video's frame rate. Playback analysis service 110 may determine the amount of the stall and compare the stall to a threshold to determine if this should be flagged as an event. For example, a stall of more than 5 frames is flagged.

Other events could be tested, such as bitrate switching and switching between content delivery networks. Bitrate switch may be determined by providing an identifier of the bitrate in the QR code. Then, playback analysis service 110 can analyze the bitrate identifiers to determine when a bitrate is switched during playback of the trace video.

For CDN switching, a CDN identifier may be included in the QR code. Playback analysis service 110 may similarly determine when the trace video switched from a first CDN to a second CDN. That is, each CDN may be delivering the trace video, with the respective CDN identifiers for the respective CDNs. When the CDN identifier changes, the CDN is considered switched.

Further, playback analysis service 110 may correlate the traffic shaping events to identifiers in the capture statistics to determine if media player 112 experienced the events at the appropriate time.

After the analysis is finished, at 408, playback analysis service 110 generates events based on the analysis.

Figure 5:
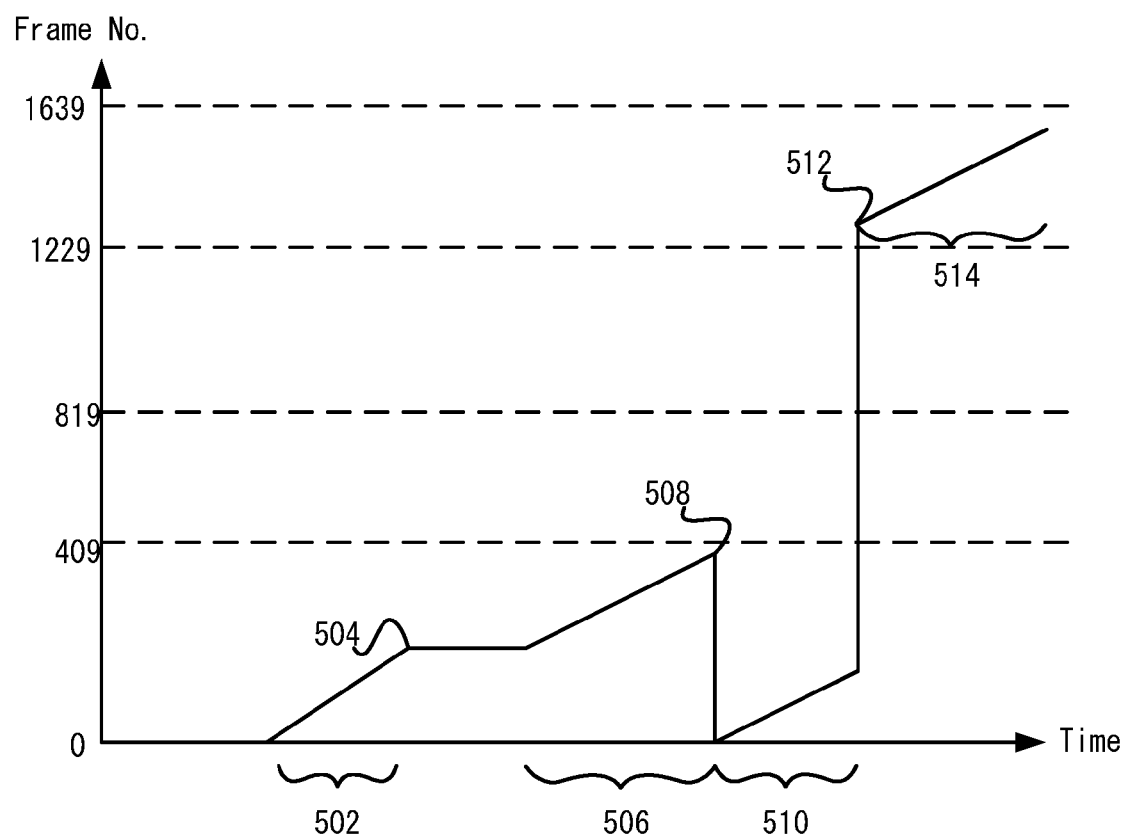
FIG. 5 shows a graph of frame tracking of the capture video according to one embodiment.

FIG. 5 shows a graph of frame tracking of the capture video according to one embodiment. As seen at 502, the frame identifiers increase linearly for a period. This may be determined by the frame identifiers in the capture video or by a comparison of the frame rates from the trace video and the identifiers in the capture video. In this case, playback analysis service 110 determines that no events have occurred. For example, frames 1-300 may be encountered in sequence. At 504, the playback identifier remains the same. For example, frame 301 may appear for 20 straight frames. Playback analysis service 110 may determine that a stall has occurred since the same frame identifier was recorded in the capture video. At 506, the playback resumed as identifiers increased in a linear manner. For example, frames 302-400 may appear in sequence. Playback analysis service 110 determines that no events occurred during this time.

At 508, the frame identifier drops back to the beginning of the playback, such as to frame 0. In this case, the playback of the video may have started over and jumped. Then, at 510, playback increases linearly without any events. For example, frames 1-100 may be encountered in sequence.

A 512, playback jumps again to a frame number above 1229. Playback analysis service 110 determines this is another skip. Then, at 514, playback increases linearly again. For example, frames 1230-1500 may be encountered in sequence.

After determining the events that occur, playback analysis service 110 needs to verify whether media player 112 is operating correctly. For example, playback analysis service 110 determines if the correct API calls were received from media player 112 during the playback.

Figure 6:
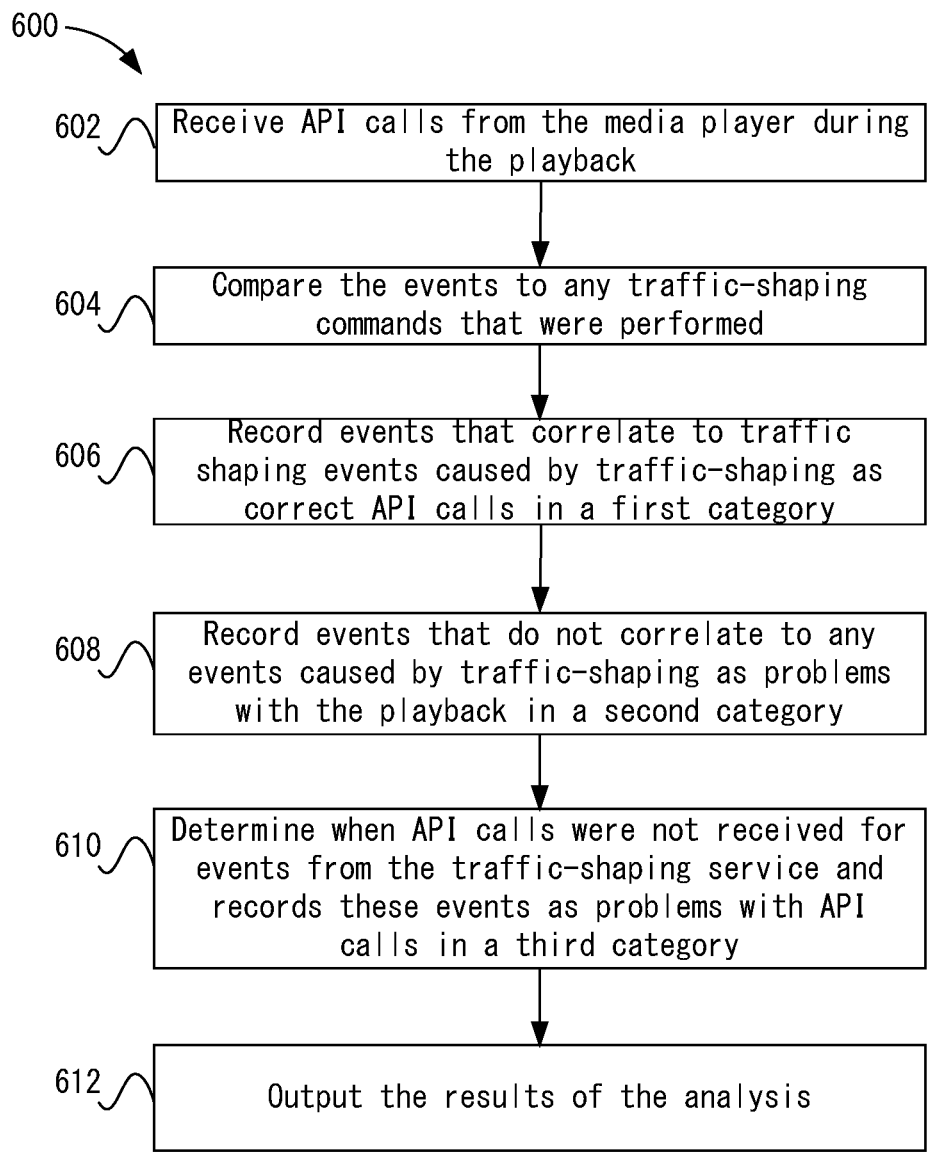
FIG. 6 depicts a simplified flowchart of a method for determining if media player operated correctly according to one embodiment.

FIG. 6 depicts a simplified flowchart 600 of a method for determining if media player 112 operated correctly according to one embodiment. At 602, playback analysis service 110 receives API calls from media player 112 during the playback. The API calls may be based on certain events that occurred during the playback of media player 112. At 604, playback analysis service 110 compares the events to any traffic-shaping commands that were performed. Playback analysis service 110 may then classify the events in different categories.

For a first category, playback analysis service 110 determines which events correspond to the traffic shaping events caused by the traffic-shaping commands. Events in the media program playback that correlate to events caused by the traffic-shaping commands are not problems being experienced by media player 112. That is, if an API call is received for an event caused via traffic-shaping, then media player 112 is operating correctly. At 606, playback analysis service 110 records events that correlate to traffic shaping events caused by traffic-shaping as correct API calls.

However, if an event occurs during media playback, but does not correlate to any events caused by traffic-shaping, this event is a problem being experienced by media player 112. In this case, 608, playback analysis service 110 records events that do not correlate to any events caused by traffic-shaping as problems with the playback in a second category.

Also, there may be events for traffic-shaping that were performed, but an API call was not received. In this case, at 610, playback analysis service 110 determines when API calls were not received for events from the traffic-shaping service and records these events as problems with API calls in a third category.

At 614, playback analysis service 110 outputs the results of the analysis. This may summarize the operation of media player 112.

Without the external verification of the playback of the media program, playback analysis service 110 would not be able to determine if media player 112 actually experienced the events. For example, when events are determined that do not correlate to traffic shaping events, the external verification is used to determine if a correct API call was received. Also, the external verification is used to verify that an API call that is received was the correct API call. If the visual verification was not used, then system 100 would not have a way to actually know that the event did not occur.

System Overview

Figure 7:
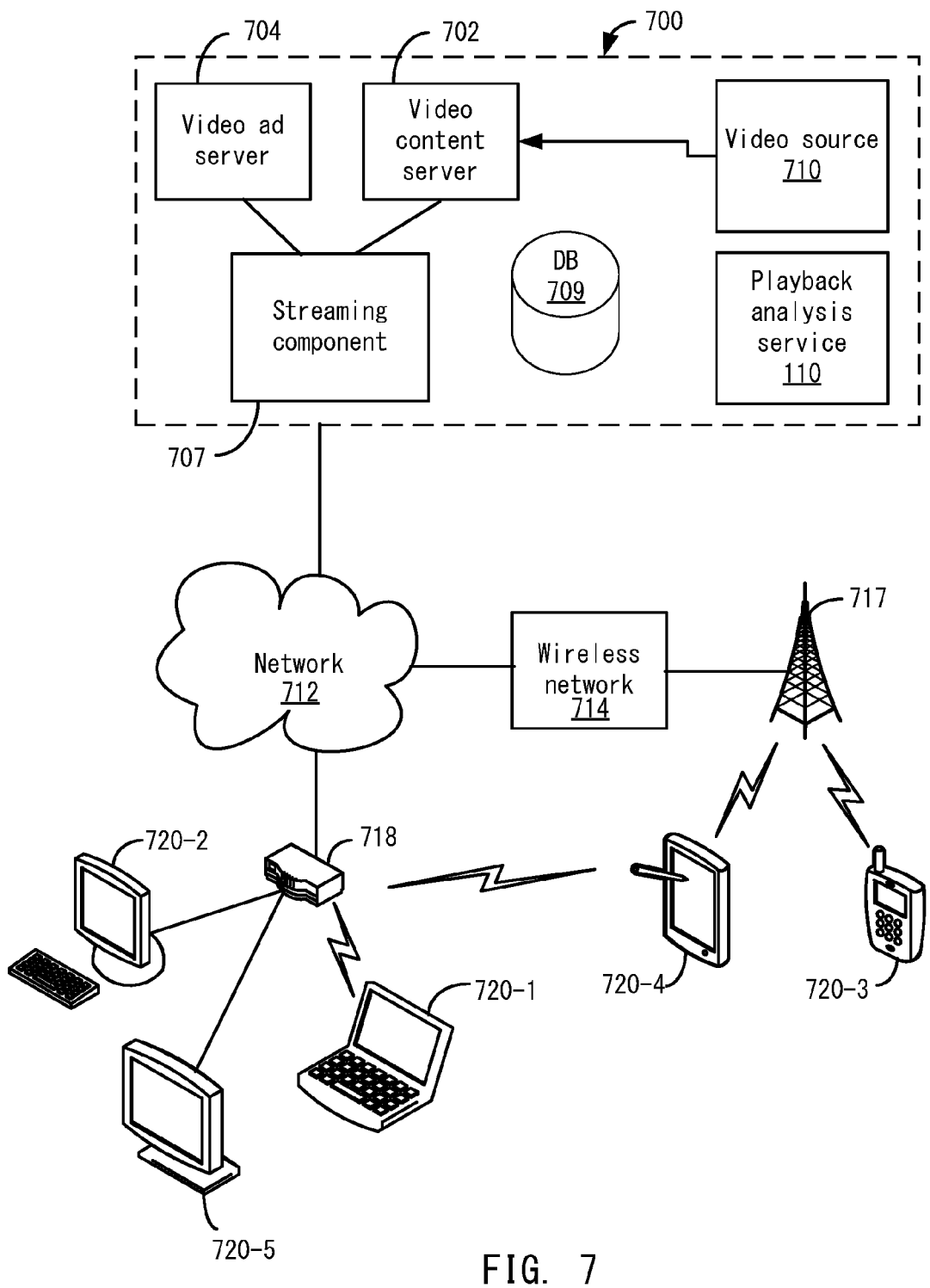
FIG. 7 depicts a video streaming system in communication with multiple client devices via one or more communication networks according to one embodiment.

Features and aspects as disclosed herein may be implemented in conjunction with a video streaming system 700 in communication with multiple client devices via one or more communication networks as shown in FIG. 7. Aspects of the video streaming system 700 are described merely to provide an example of an application for enabling distribution and delivery of content prepared according to the present disclosure. It should be appreciated that the present technology is not limited to streaming video applications, and may be adapted for other applications and delivery mechanisms.

In one embodiment, a media program provider may include a library of media programs. For example, the media programs may be aggregated and provided through a site (e.g., Website), application, or browser. A user can access the media program provider's site or application and request media programs. The user may be limited to requesting only media programs offered by the media program provider.

In system 700, video data may be obtained from one or more sources for example, from a video source 710, for use as input to a video content server 702. The input video data may comprise raw or edited frame-based video data in any suitable digital format, for example, Moving Pictures Experts Group (MPEG)-1, MPEG-2, MPEG-4, VC-1, H.264/Advanced Video Coding (AVC), High Efficiency Video Coding (HEVC), or other format. In an alternative, a video may be provided in a non-digital format and converted to digital format using a scanner and/or transcoder. The input video data may comprise video clips or programs of various types, for example, television episodes, motion pictures, and other content produced as primary content of interest to consumers. The video data may also include audio or only audio may be used.

The video streaming system 700 may include one or more computer servers or modules 702, 704, and/or 707 distributed over one or more computers. Each server 702, 704, 707 may include, or may be operatively coupled to, one or more data stores 709, for example databases, indexes, files, or other data structures. A video content server 702 may access a data store (not shown) of various video segments. The video content server 702 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 704 may access a data store of relatively short videos (e.g., 10 second, 30 second, or 60 second video advertisements) configured as advertising for a particular advertiser or message. The advertising may be provided for an advertiser in exchange for payment of some kind, or may comprise a promotional message for the system 700, a public service message, or some other information. The video advertising server 704 may serve the video advertising segments as directed by a user interface controller (not shown).

The video streaming system 700 also may include playback analysis service 110.

The video streaming system 700 may further include an integration and streaming component 707 that integrates video content and video advertising into a streaming video segment. For example, streaming component 707 may be a content server or streaming media server. A controller (not shown) may determine the selection or configuration of advertising in the streaming video based on any suitable algorithm or process. The video streaming system 700 may include other modules or units not depicted in FIG. 7, for example administrative servers, commerce servers, network infrastructure, advertising selection engines, and so forth.

The video streaming system 700 may connect to a data communication network 712. A data communication network 712 may comprise a local area network (LAN), a wide area network (WAN), for example, the Internet, a telephone network, a wireless cellular telecommunications network (WCS) 714, or some combination of these or similar networks.

One or more client devices 720 may be in communication with the video streaming system 700, via the data communication network 712 and/or other network 714. Such client devices may include, for example, one or more laptop computers 720-1, desktop computers 720-2, "smart" mobile phones 720-3, tablet devices 720-4, network-enabled televisions 720-5, or combinations thereof, via a router 718 for a LAN, via a base station 717 for a wireless telephony network 714, or via some other connection. In operation, such client devices 720 may send and receive data or instructions to the system 700, in response to user input received from user input devices or other input. In response, the system 700 may serve video segments and metadata from the data store 709 responsive to selection of media programs to the client devices 720. Client devices 720 may output the video content from the streaming video segment in a media player using a display screen, projector, or other video output device, and receive user input for interacting with the video content.

Distribution of audio-video data may be implemented from streaming component 707 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidths and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 707 may communicate with client device 720 using control messages and data messages to adjust to changing network conditions as the video is played. These control messages can include commands for enabling control functions such as fast forward, fast reverse, pausing, or seeking to a particular part of the file at the client.

Since streaming component 707 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 707 may use TCP-based protocols, such as HTTP and Real Time Messaging Protocol (RTMP). Streaming component 707 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Another protocol used for streaming is hypertext transfer protocol (HTTP) live streaming (HLS) or Dynamic Adaptive Streaming over HTTP (DASH). The HLS or DASH protocol delivers video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, using a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 8:
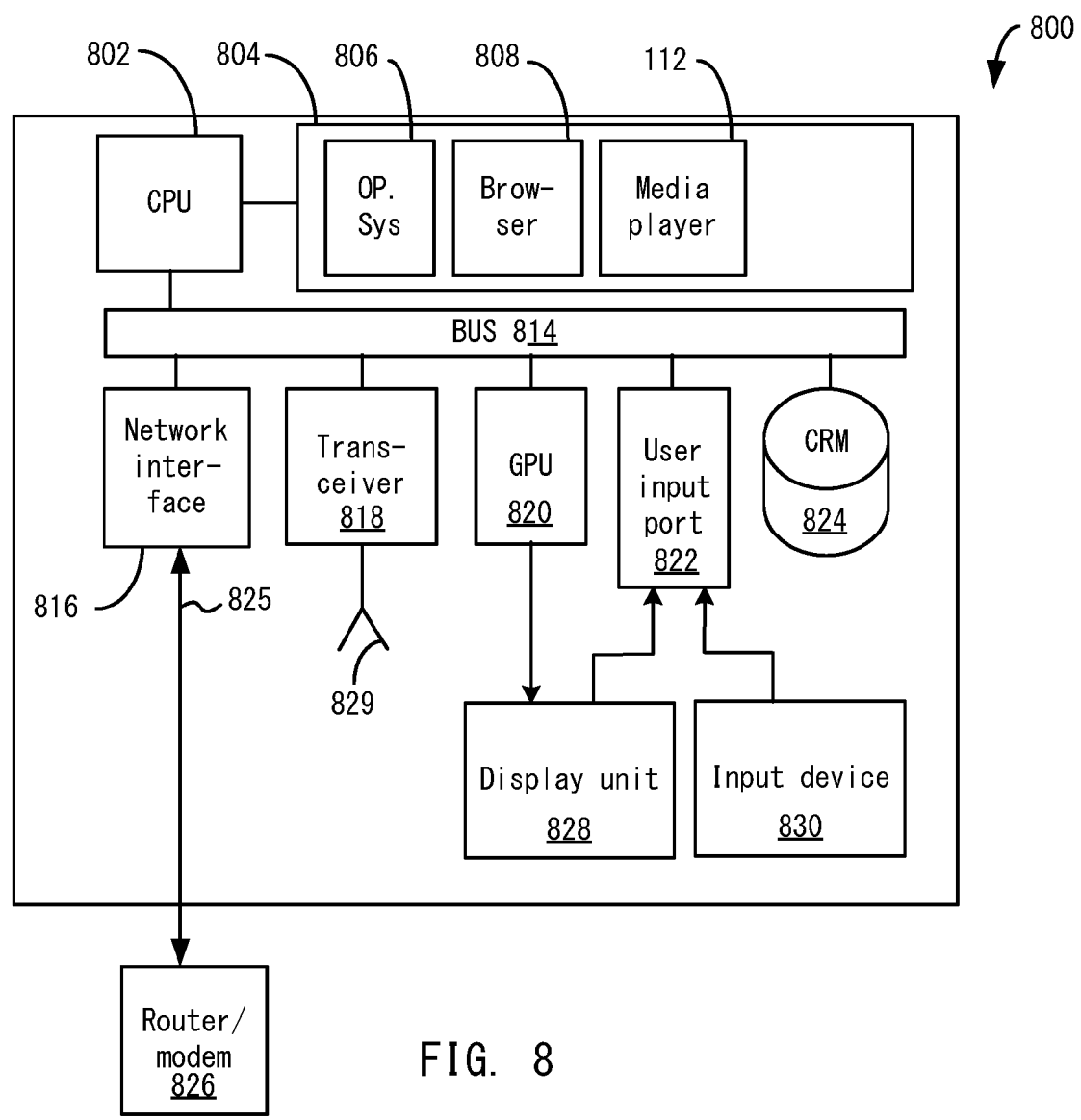
FIG. 8 depicts a diagrammatic view of an apparatus for viewing video content.

Referring to FIG. 8, a diagrammatic view of an apparatus 800 for viewing video content and advertisements is illustrated. In selected embodiments, the apparatus 800 may include a processor (CPU) 802 operatively coupled to a processor memory 804, which holds binary-coded functional modules for execution by the processor 802. Such functional modules may include an operating system 806 for handling system functions such as input/output and memory access, a browser 808 to display web pages, and media player 810 for playing video. The modules may further include media player 112. The memory 804 may hold additional modules not shown in FIG. 8, for example modules for performing other operations described elsewhere herein.

A bus 814 or other communication component may support communication of information within the apparatus 800. The processor 802 may be a specialized or dedicated microprocessor configured to perform particular tasks in accordance with the features and aspects disclosed herein by executing machine-readable software code defining the particular tasks. Processor memory 804 (e.g., random access memory (RAM) or other dynamic storage device) may be connected to the bus 814 or directly to the processor 802, and store information and instructions to be executed by a processor 802. The memory 804 may also store temporary variables or other intermediate information during execution of such instructions.

A computer-readable medium in a storage device 824 may be connected to the bus 814 and store static information and instructions for the processor 802; for example, the storage device (CRM) 824 may store the modules 806, 808, 810 and 812 when the apparatus 800 is powered off, from which the modules may be loaded into the processor memory 804 when the apparatus 800 is powered up. The storage device 824 may include a non-transitory computer-readable storage medium holding information, instructions, or some combination thereof, for example instructions that when executed by the processor 802, cause the apparatus 800 to be configured to perform one or more operations of a method as described herein.

A communication interface 816 may also be connected to the bus 814. The communication interface 816 may provide or support two-way data communication between the apparatus 800 and one or more external devices, e.g., the streaming system 700, optionally via a router/modem 826 and a wired or wireless connection. In the alternative, or in addition, the apparatus 800 may include a transceiver 818 connected to an antenna 829, through which the apparatus 800 may communicate wirelessly with a base station for a wireless communication system or with the router/modem 826. In the alternative, the apparatus 800 may communicate with a video streaming system 700 via a local area network, virtual private network, or other network. In another alternative, the apparatus 800 may be incorporated as a module or component of the system 800 and communicate with other components via the bus 814 or by some other modality.

The apparatus 800 may be connected (e.g., via the bus 814 and graphics processing unit 820) to a display unit 828. A display 828 may include any suitable configuration for displaying information to an operator of the apparatus 800. For example, a display 828 may include or utilize a liquid crystal display (LCD), touchscreen LCD (e.g., capacitive display), light emitting diode (LED) display, projector, or other display device to present information to a user of the apparatus 800 in a visual display.

One or more input devices 830 (e.g., an alphanumeric keyboard, microphone, keypad, remote controller, game controller, camera or camera array) may be connected to the bus 814 via a user input port 822 to communicate information and commands to the apparatus 800. In selected embodiments, an input device 830 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 828, for example using a touch sensitive screen. A cursor control device may communicate direction information and command selections to the processor 802 and control cursor movement on the display 828. A cursor control device may have two or more degrees of freedom, for example allowing the device to specify cursor positions in a plane or three-dimensional space.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be configured to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
receiving, by a computing device, a capture video of an external capture of a trace video being played on a media player of a hardware platform, wherein the trace video displays visual codes on the media player, and wherein a capture device captured images of the trace video at a first capture rate determined based on a second frame rate of the trace video;
analyzing, by the computing device, frames of the capture video to extract visible codes on each of the frames, each visible code associated with an identifier identifying a respective frame of the capture video;
determining, by the computing device, that an event occurred during playback of the capture video on the media player by comparing a sequence of the identifiers to an expected sequence of frames of the trace video; and
correlating, by the computing device, the event to a set of calls received from the media player to determine whether a call was received that corresponds to the event while the media player was playing the capture video.

2. The method of claim 1, further comprising:
receiving the set of calls from the media player when events occur at the media player during playback of the trace video; and
determining whether a corresponding event is identified in the capture video for each of the set of calls.

3. The method of claim 1, wherein the external capture is performed by capturing images of the trace video displayed by the media player on a display.

4. The method of claim 1, wherein the external capture is performed via the capture device that is coupled to an external output of the hardware platform including the media player, the external output outputting the images of the trace video to the capture device.

5. The method of claim 1, wherein a traffic shaping service causes events to occur during the playback of the trace video by the media player.

6. The method of claim 1, wherein the second frame rate is similar to the first capture rate.

7. The method of claim 1, wherein the second frame rate is at least as fast as the first capture rate.

8. The method of claim 1, wherein the visual codes in successive frames of the trace video are located in different positions.

9. The method of claim 8, wherein the visual codes continually change in a pattern of different positions in a successive sequence of the frames.

10. A method comprising:
receiving, by a computing device, a capture video of an external capture of a trace video being played on a media player of a hardware platform, wherein the trace video displays visual codes on the media player;
analyzing, by the computing device, frames of the capture video to extract visible codes on each of the frames, each visible code associated with an identifier identifying a respective frame of the capture video;
determining, by the computing device, that an event occurred during playback of the capture video on the media player by comparing a sequence of the identifiers to an expected sequence of frames of the trace video, wherein determining that the event occurred comprises:
determining, by the computing device, a first rate of change for the trace video and a second rate of change for the capture video;

generating, by the computing device, a comparison of the second rate of change to the first rate of change over a period of time;

analyzing, by the computing device, the comparison to determine when the comparison varies from a linear relationship that violates a threshold; and determining, by the computing device, the event occurred when the threshold is violated; and correlating, by the computing device, the event to a set of calls received from the media player to determine whether a call was received that corresponds to the event while the media player was playing the capture video.

11. A non-transitory computer-readable storage medium containing instructions, that when executed, control a computer system to be configured for:

receiving a capture video of an external capture of a trace video being played on a media player of a hardware platform, wherein the trace video displays visual codes on the media player, and wherein a capture device captured images of the trace video at a first capture rate determined based on a second frame rate of the trace video;

analyzing frames of the capture video to extract visible codes on each of the frames, each visible code associated with an identifier identifying a respective frame of the capture video;

determining that an event occurred during playback of the capture video on the media player by comparing a sequence of the identifiers to an expected sequence of frames of the trace video; and correlating the event to a set of calls received from the media player to determine whether a call was received that corresponds to the event while the media player was playing the capture video.

12. The non-transitory computer-readable storage medium of claim 11, further configured for:

receiving the set of calls from the media player when events occur at the media player during playback of the trace video; and determining whether a corresponding event is identified in the capture video for each of the set of calls.

13. The non-transitory computer-readable storage medium of claim 11, wherein the external capture is performed by recording images of the trace video displayed by the media player on a display.

14. The non-transitory computer-readable storage medium of claim 11, wherein the external capture is performed via the capture device that is coupled to an external output of the hardware platform including the media player, the external output outputting the images of the trace video to the capture device.

15. The non-transitory computer-readable storage medium of claim 11, wherein a traffic shaping service causes events to occur during the playback of the trace video by the media player.

16. The non-transitory computer-readable storage medium of claim 11, wherein the visual codes in successive frames of the trace video are located in different positions.

17. The non-transitory computer-readable storage medium of claim 11, wherein the second frame rate is similar to the first capture rate.

18. The non-transitory computer-readable storage medium of claim 11, wherein the second frame rate is at least as fast as the first capture rate.

19. A non-transitory computer-readable storage medium containing instructions, that when executed, control a computer system to be configured for:

receiving a capture video of an external capture of a trace video being played on a media player of a hardware platform, wherein the trace video displays visual codes on the media player;

analyzing frames of the capture video to extract visible codes on each of the frames, each visible code associated with an identifier identifying a respective frame of the capture video;

determining that an event occurred during playback of the capture video on the media player by comparing a sequence of the identifiers to an expected sequence of frames of the trace video, wherein determining that the event occurred comprises:

determining a first rate of change for the trace video and a second rate of change for the capture video;

generating a comparison of the second rate of change to the first rate of change over a period of time;

analyzing the comparison to determine when the comparison varies from a linear relationship that violates a threshold; and determining the event occurred when the threshold is violated; and correlating the event to a set of calls received from the media player to determine whether a call was received that corresponds to the event while the media player was playing the capture video.

20. An apparatus comprising:

one or more computer processors; and a non-transitory computer-readable storage medium comprising instructions, that when executed, control the one or more computer processors to be configured for:

receiving a capture video of an external capture of a trace video being played on a media player of a hardware platform, wherein the trace video displays visual codes on the media player, and wherein a capture device captured images of the trace video at a first capture rate determined based on a second frame rate of the trace video;

analyzing frames of the capture video to extract visible codes on each of the frames, each visible code associated with an identifier identifying a respective frame of the capture video;

determining that an event occurred during playback of the capture video on the media player by comparing a sequence of the identifiers to an expected sequence of frames of the trace video; and correlating the event to a set of calls received from the media player to determine whether a call was received that corresponds to the event while the media player was playing the capture video.

* * * * *